United States Patent [19]
Borza

[11] Patent Number: 5,778,089
[45] Date of Patent: Jul. 7, 1998

[54] DRIVER CIRCUIT FOR A CONTACT IMAGING ARRAY

[75] Inventor: Michael Andrew Borza, Ottawa, Canada

[73] Assignee: Dew Engineering and Development Limited, Ottawa, Canada

[21] Appl. No.: 608,007

[22] Filed: Mar. 4, 1996

[51] Int. Cl.⁶ ............................................. G06K 9/00
[52] U.S. Cl. ................ 382/124; 340/825.34; 250/556
[58] Field of Search .............................. 382/124–127, 382/115; 356/71; 73/862.046; 340/825.34; 250/307, 370.01, 370.08, 553, 221, 556

[56] References Cited

U.S. PATENT DOCUMENTS

| | | | |
|---|---|---|---|
| 3,781,855 | 12/1973 | Killen | 382/124 |
| 4,429,413 | 1/1984 | Edwards | 382/124 |
| 4,695,716 | 9/1987 | Tandon et al. | 250/211 R |
| 5,079,949 | 1/1992 | Tamori | 73/172 |
| 5,325,442 | 6/1994 | Knapp | 382/124 |
| 5,373,181 | 12/1994 | Scheiter et al. | 257/415 |
| 5,400,662 | 3/1995 | Tamori | 382/124 |

OTHER PUBLICATIONS

Mosley et al., "CCD Imaging Arrays", EDN Special Report, v35, n17, p. 116 (10), Aug. 20, 1990.

*Primary Examiner*—Leo H. Boudreau
*Assistant Examiner*—Bhavesh Mehta
*Attorney, Agent, or Firm*—Neil Teitelbaum & Associates

[57] ABSTRACT

A fingerprint sensing device and recognition system includes an array of closely spaced apart sensing elements each comprising a sensing electrode and an amplifier circuit. The device is used to sense electrical charge on a fingertip and obviates the need to pre-charge the sensing electrode. The device may be constructed with a single die or with multiple dies.

18 Claims, 5 Drawing Sheets

DRIVER CIRCUIT FOR A CONTACT IMAGING ARRAY

FIELD OF THE INVENTION

This invention relates generally to imaging devices and more particularly to contact imaging devices for imaging fingerprints and the like.

This application is related to copending application Ser. No. 08/554,357.

BACKGROUND OF THE INVENTION

In a fingerprint input transducer or sensor, the finger under investigation is usually pressed against a flat surface, such as a side of a glass plate, and the ridge and valley pattern of the finger tip is sensed by a sensing means such as an interrogating light beam. Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

One of the problems associated with fingerprint sensors concerns the reliable and accurate transformation of ridge and valley pattern of the finger tip into electrical or optical signals to be stored in a digital format. Optical systems as described above, for example using a prism, require sophisticated equipment and tend to be bulky and costly.

In an attempt to overcome some of the limitations and disadvantages of using optical systems based on illumination of the finger tip, U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

While the described sensor may not suffer from the problems associated with the kind of sensor employing an optical sensing technique, it suffers from its own problems. For example, applying a voltage to the array of capacitors requires circuitry to each capacitor for charging. Such charging also requires further states in the imaging process consuming more resources and providing added areas for unreliability. Moreover, the need to provide a respective connection to each individual capacitor in the array means that a very large number of connecting lines is necessary. This creates difficulties, both in the fabrication of the sensing member and its interconnection with the detection circuit.

In yet another attempt to improve upon deficiencies and limitations of the aforementioned and other prior art, a further contact imaging device is described in U.S. Pat. No. 5,325,442 in the name of Knapp, issued Jun. 28, 1994. Those parts of the disclosure of this patent not included in this specification are incorporated herein by reference.

Knapp describes making a capacitance measuring imaging device in the form of a single large active matrix array involving deposition and definition by photolithographic processes of a number of layers on a single large insulating substrate. Electrodes and sets of address conductors formed of metal and field effect transistors are formed as amorphous silicon or polycrystalline silicon thin film transistors (TFTs) using an appropriate substrate of, for example, glass or quartz.

Although Knapp attempts to provide an improvement over Tsikos mentioned above, other disadvantages and limitations become evident in the manufacture implementation of Knapp's disclosed device. Firstly, it is extremely difficult to produce a single large imaging contact device, for example comprised of a single silicon die cut from a silicon wafer. Fabricating a device with a contact area of 0.75 inches by 0.75 inches or larger, approximately a required dimension for imaging a fingerprint, is impractical due to the fragile nature of silicon devices. Aside from large dies being costly to manufacture, they have lower manufacturing yields than smaller dies. When square or rectangular dies are cut from a substantially round silicon wafer, there is less loss at the edges of the wafer when small dies are cut. The mechanical strength of these chips also limits their use in contact applications; for instance, the force of a finger contacting and resting upon a large die can cause a crack or stress fracture. Furthermore, current, conventional photolithographic systems are typically equipped for the production of dies that have a maximum dimension of about 0.4 inches to 0.5 inches.

OBJECT OF THE INVENTION

Thus, in an attempt to overcome these and other limitations of known prior art devices, it is an object of this invention to provide a new contact imaging device.

It is an object of the invention to provide a device that utilizes a plurality of small charge sensing devices arranged in an array to overcome some of the aforementioned limitations of capacitive measurement.

It is a further object of the invention to provide a contact imaging device that is relatively inexpensive and practicable to manufacture.

SUMMARY OF THE INVENTION

In accordance with the invention there is provided a fingerprint sensing device comprising:
an array of sense elements spaced apart and comprising a sensing electrode and an amplifier circuit wherein the amplifier circuit amplifies voltage induced in the sensing electrode by a biological source, each sense element absent means for inducing a predetermined charge on the sensing electrode.

In accordance with the invention there is further provided a fingerprint sensing device comprising:

a substrate;

an array of dies spaced in close proximity to each other for sensing a fingerprint, the array of dies being bonded to the substrate, each die comprising a ground plane, an array of sense elements spaced apart and disposed on and spaced from one face of the ground plane and comprising a sensing electrode and an amplifier circuit wherein the amplifier circuit amplifies voltage induced in the sensing electrode by a biological source, each die absent means for inducing a predetermined charge on the array of sense elements.

In accordance with the invention there is yet further provided a fingerprint sensing device comprising:

at least a die for sensing a fingerprint, each at least a die comprising an array of sense elements spaced apart and comprising a sensing electrode, electrostatic protection means, a low pass filter, and an amplifier circuit wherein the amplifier circuit is capable of amplifying a voltage induced in the sensing electrode by a biological source, each die absent means for inducing a predetermined charge on the array of sense elements.

BRIEF DESCRIPTION OF THE DRAWINGS

Exemplary embodiments of the invention will now be described in conjunction with the following drawings, in which.

DETAILED DESCRIPTION OF THE INVENTION

A sensing device according to this invention comprises a substantially flat surface upon which a fingertip can be placed. Below the surface are sensing elements which are designed to sense induced electrical charge. The distance between the fingertip and individual sensing elements should generally be kept to a very small gap in order to retain a high signal to noise ratio.

Figure 1:
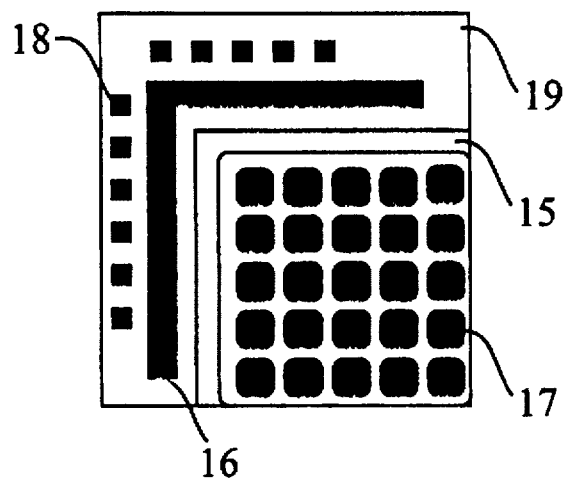
FIG. 1 is a simplified diagram of a sensing device according to the present invention showing an array of sensing elements together with associated addressing circuitry.

Referring to FIG. 1, part of a sensing device according to the present invention and implemented on a semiconductor chip is shown comprising a single active matrix addressed sensing pad 19 having an X-Y array of sense elements consisting of r rows (1 to r) with c sensing elements 17 in each row. In practice there maybe about 300 rows and 200 columns of regularly-spaced elements occupying an area of approximately 2 cm×3 cm. This area is for accepting a fingertip for scanning. Should such a sensing pad 19 be made larger, it could be used for scanning other items such as a palm of a hand.

Sensor elements 17 are disposed in such a fashion that they are capable of distinguishing the smallest desired feature of a fingerprint. The placement and spacing of the sensor elements should allow an image of a fingerprint, once scanned, to contain all required features for analysis. A sensing element 17 must be smaller than half the smallest sensable feature size in order to generate such an image. Empirical studies reveal that a square plate of about 50 μm edge length is suitable for fingerprint sensing. Although the apparatus is described with reference to an array of sensing elements 17 having substantially square shape, it is possible to use different configurations of sensing elements 17 such as concentric circles or a spiral and different shapes such as triangles, circles, or rectangles.

The array of sensing elements 17 is connected through an analog switch matrix to facilitate reading the fingerprint image out of the sensing array 19. Timing and sequencing logic 16 selects each element in the array in turn to produce a complete image of a fingerprint presented to the device. The signal may be output directly as an analog signal or may be converted to a digital signal prior to output from the device.

The sensing pad 19 further comprises a ground ring 15 and bonding pads 18 designed for connection to other components or to packaging. The ground ring 15 also serves to provide a common ground for the sensing pad. In this role, it is important that the ground ring 15 and integrated circuit elements be designed so as to minimize noise to each sensing element 17. The signal to noise ratio that is acceptable will vary between applications and should be adjusted to meet the needs of a specific design. When possible, packaging should be selected to limit noise.

Figure 2:
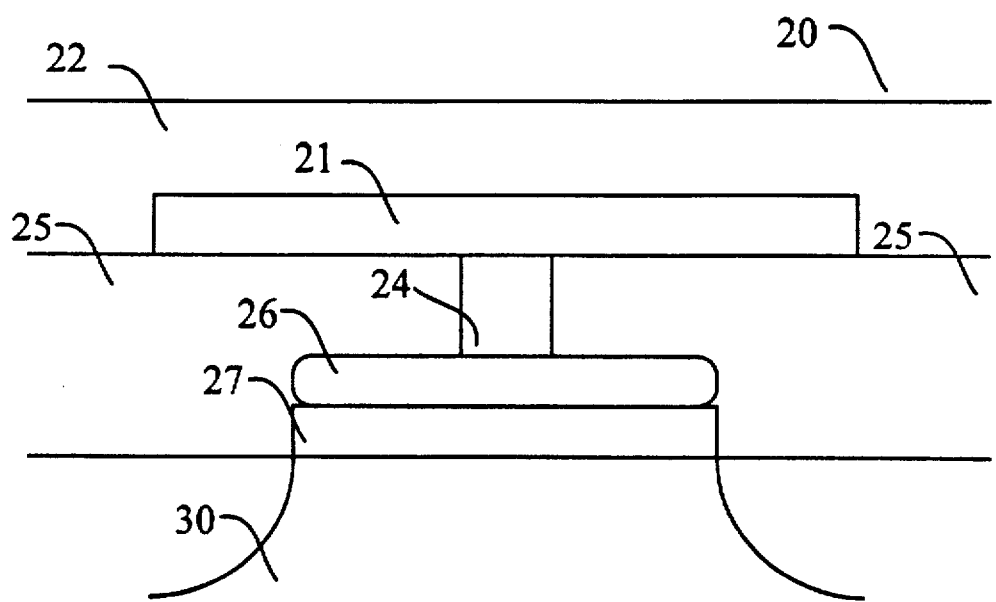
FIG. 2 is a simplified diagram of a sensing element for use with the present invention.

Referring to FIG. 2, a single sensing plate 20 is shown. Such a sensing plate 20 is designed to be used in arrays and must be smaller than half the smallest sensable feature size as indicated above. Charge sensing electrode 21 is connected to an active element which is shown as a three terminal switching device in the form of a field effect transistor (FET) having a source, a drain, and a gate 26. The gate 26 is connected to the sensing electrode 21 by an interconnect 24. Disposed between the gate 26 and the transistor 30 is a gate oxide 27. Such transistor configuration is known in the art.

Above the charge sensing electrode 21 is disposed an overglass 22 which serves to protect the charge sensing electrode 21 and to space the electrode and a fingertip presented thereto. Below the charge sensing electrode 21 is disposed a field oxide 25. A finger placed against the overglass 22 induces charge in the charge sensing electrode 21. The charge so induced will be greater for portions of the fingertip which are in contact with the overglass 22—ridges—than for those portions of the fingertip spaced from the overglass 22—valleys. By amplifying the charges so induced with an amplifier circuit such as is shown in FIG. 3, the induced charges can be rendered easily distinguishable.

Assuming that the charge density on the fingertip is substantially even, induced charges on the charge sensing electrode 21 will depend solely on the distance between the charge sensing electrode 21 and the skin of the fingertip inducing the charge. Further, as the induced charge falls off with the distance, the closest skin of the fingertip will induce a larger proportion of the charge. The present invention is employed in the above fashion to image fingertips or more accurately to image fingerprints without a need for an initial predetermined charge on the sensing electrodes 21.

Figure 3:
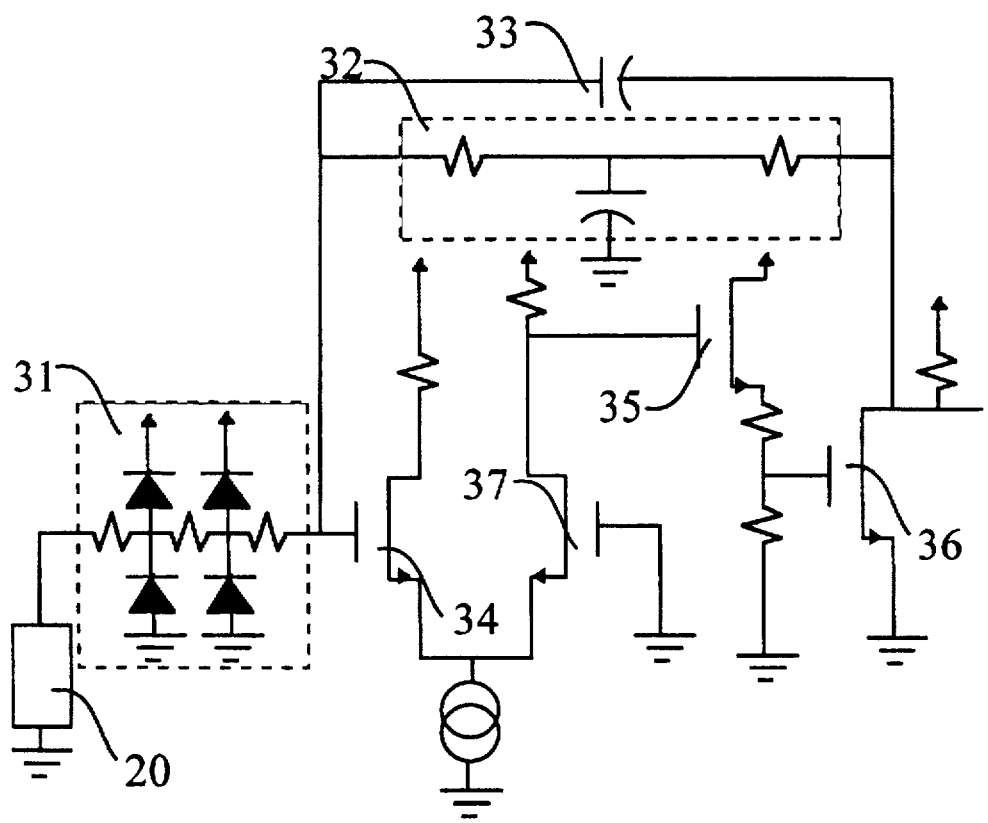
FIG. 3 is a schematic diagram of an amplifier circuit for use with the present invention.

Referring to FIG. 3, an amplifier circuit for use with the present invention is disclosed. Other suitable amplifier circuits may also be used. A distributed diode resistor network 31 is used to protect the amplifier circuit from electrostatic discharge. A low pass filter network 32, shown as a combination of two resistors and a capacitor stabilizes the DC operating point without impacting AC gain of the amplifier circuit. Any low pass filter circuit with similar characteristics may be employed. The cutoff frequency of the filter is set well below 1 Hz to keep gain high for slowly varying signals.

Capacitor 33 having a capacitance of $C_f$ provides feedback necessary to convert the input charge to a proportional voltage. Sensitivity of the amplifier in its passband is set by the choice of $C_f$ as $V_o = Q_i / C_f$, where $Q_i$ is the input charge at sense electrode 20. For example, at $C_f = 0.2$ pF, sensitivity of approximately 5 V/pC is achieved. In practice, the capacitance of the input transistor 34 and protection network 31 attenuates the signal, which affects the final design gain of the amplifier and choice of feedback capacitance $C_f$. Thus, it is suggested that some tuning of the circuit be performed during design.

Amplifiers 35 and 36 and associated circuitry provide level shifting and additional voltage gain. Output from the amplifier 36 is selectively switched by on-chip sequential control logic similar to that used in solid state serial memory devices to produce a serialized stream of output signals corresponding to an output of each sensing element 20 at discrete points in time. Alternatively, the output from the amplifier may be switched by random access logic as is used in random access memory devices and then digitized. The order of the switching and the digitizing can be reversed but requires more logic and is thus more costly.

Figure 4A:
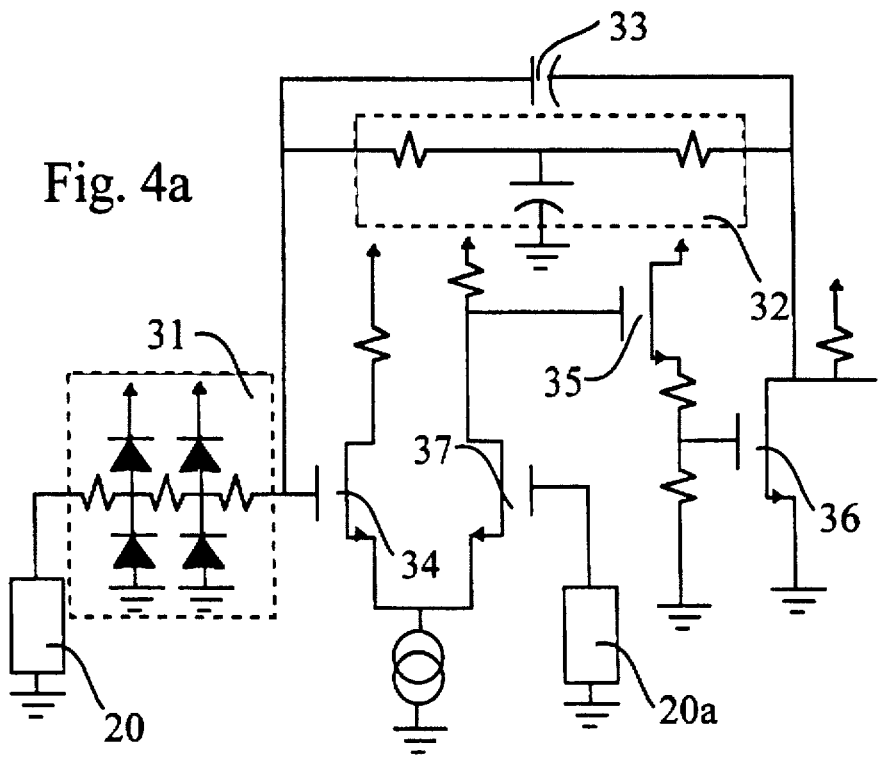
FIG. 4a is a schematic diagram of an alternative amplifier circuit in the form of a differential amplifier for use with the present invention.

Two alternative embodiments for the amplifier circuit are shown in FIG. 4. FIG. 4a shows a true differential amplifier. Though similar to the amplifier circuit of FIG. 3, The transistor 37 is connected to at least an adjacent sensing element 20a. In practice such a differential amplifier circuit reduces common mode voltages thereby increasing resolution. In FIG. 3, the transistor 37 is connected to ground providing a virtual reference of ground. Thus the circuit of FIG. 3 measures all induced voltages relative to a ground including any common mode voltage induced. Preferably, the ground is a common ground in the form of the ground ring 15. When using the circuit of FIG. 4a with multiple adjacent sensing elements used as a reference complexity is introduced to the amplifier and potentially added cost.

Figure 4B:
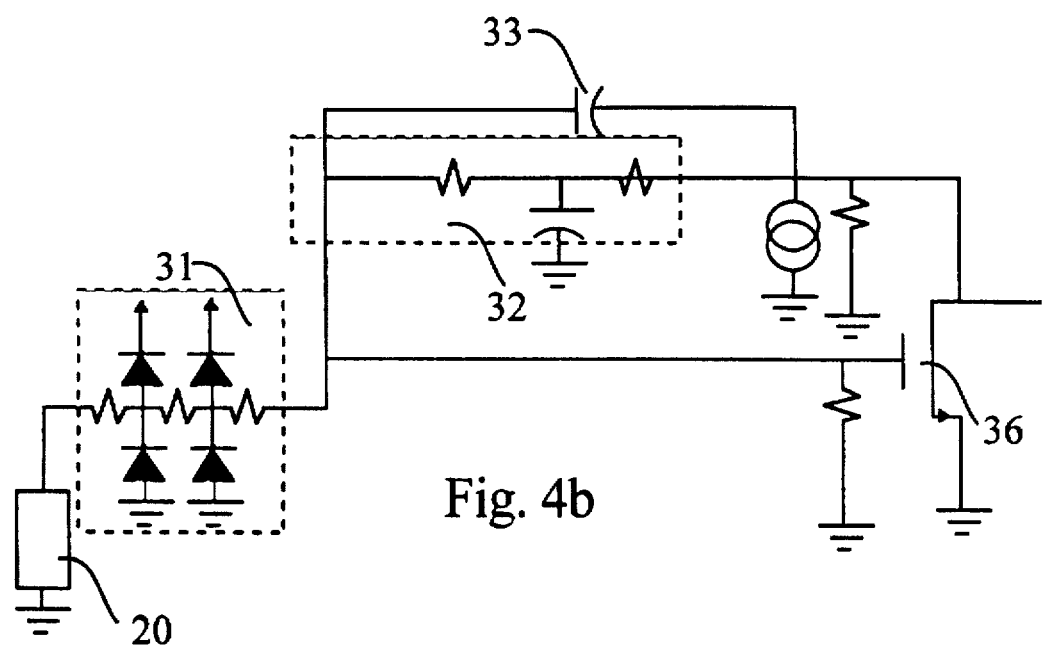
FIG. 4b is a schematic diagram of an alternative amplifier circuit for use with the present invention.

FIG. 4b shows another alternative embodiment for the amplifier circuit. This circuit is very simple and similar to amplification of a current source. By treating the induced charge on the sensing elements as a current source, the number of transistors required is minimized and the yield is effectively increased. The overall circuit comprises electrostatic protection circuitry 31, a low pass filter 32, and an amplifier circuit.

In use the invention amplifies the charge present on a fingertip presented to it. In so doing, the device obviates the need to apply a predetermined initial charge to the sensing electrode as is present in the prior art. Avoiding the initial charging of the sensing electrode simplifies the overall circuit and removes some sources of noise caused by added circuitry necessary for accomplishing the initial charging. This benefit also results in a reduced state machine for the contact imaging device.

Figure 5A:
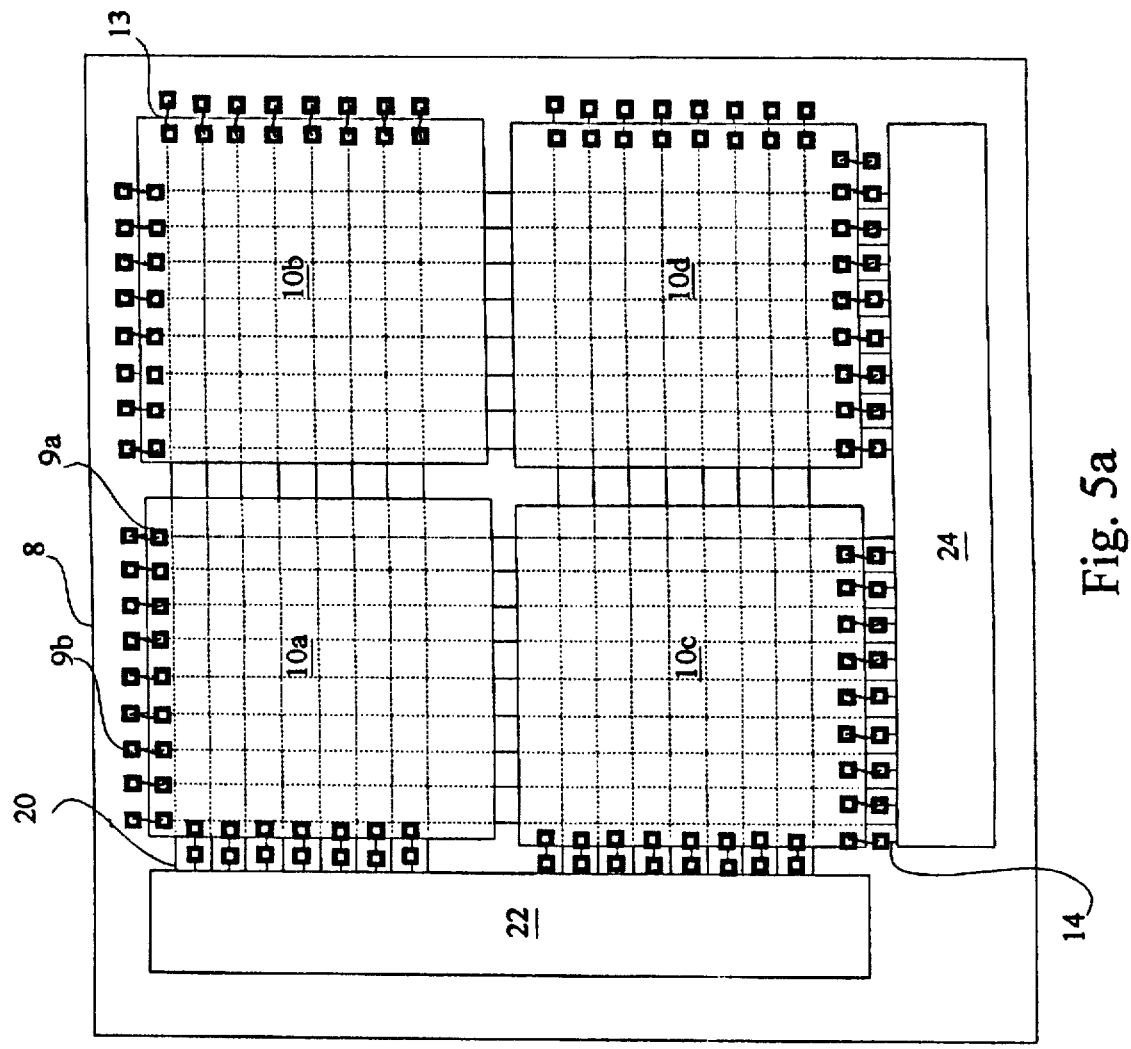
FIG. 5a is a simplified diagram of a sensing device according to the present invention showing an array of sensing elements disposed on a plurality of dies together with associated addressing circuitry; and, FIG. 5b is a broken away side view of a sensing device in accordance with the present invention showing an array of sensing elements disposed on a plurality of dies together with associated addressing circuitry.
Figure 5B:
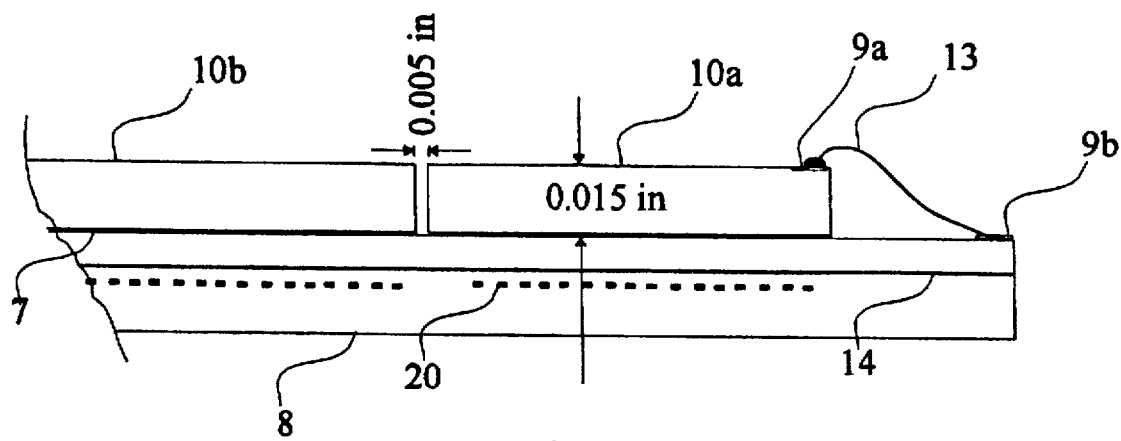

In a further embodiment of the invention shown in FIG. 5a, a sensing device in accordance with this invention is shown, comprising, but not being limited to 4 sensing pads in the form of an array of discrete contact imaging dies that are disposed next to one another is a close, but non-contacting relationship. Preferably, the sensing pads 10a, 10b, 10c, and 10d, (generally referred to as 10) comprise a total surface area large enough to accommodate a finger and are in as near a proximity to one another as is possible; however, under all conditions there must be a small gap between adjacent dies to avoid contact between adjacent edges. The gap must also be suitable to ensure that wiping of adjacent edges does not occur when at least one sensing pad next to another is flexed under the force of a finger pressed upon it. Thus it is preferred there be a gap of approximately 0.0020 in. or greater between adjacent sensing pads. On the other hand if the gap is too large, areas of a finger covering the gap will not be sensed. In an embodiment, a gap of 0.0020 in. between adjacent silicon chips is provided that allows flexure of up to 5° without adjacent edges of the sensing pads 10a and 10b physically wiping against one another. In the embodiment shown in FIG. 5b, each sensing pad includes approximately 100 rows and 100 columns of regularly spaced sensing elements, each pad occupying an area of approximately 0.4 in.×0.4 in. We have found that a system with a single silicon sensing pad having larger dimensions of approximately 0.75 in.×0.75 in. or greater as is taught in the prior art, is not practicable. As is illustrated in FIG. 5b, the 4 contact imaging devices are assembled on to a carrier board of FR4 or Ceramic ($Al_2O_3$). The dies 10a through 10d are bonded to the substrate 8 using a suitable adhesive such as epoxy 7. An Ablestick 84LMIT™ epoxy is used where back side connectivity from the die to a ground plane is required. An X-pattern of epoxy 7 under each die is applied to the substrate to achieve nearly void-free die attachment. The epoxy is dispensed through a syringe, (not shown,) having a needle radius of 0.0178 in. Approximately 0.0008 $in^3$ of epoxy is required to provide two lines of epoxy 0.4 in. long forming the X-pattern shown. The die 10 is then pressed into epoxy 7 using a vacuum gripper (not shown) The final die height in the epoxy 7 is controlled using a robotic placement cell (not shown) pushing the die to a predetermined depth into the epoxy 7, or by placing glass beads of a known diameter into the epoxy as a form of stand-off to ensure that the dies are being glued to at a desired height from the substrate.

After the dies 10a, 10b, 10c, and 10d are glued onto the carrier substrate 8, they are electrically connected to routing tracks (14 or 20) that have been deposited onto the substrate. The electrical connection is made via a wire bond 13 between the die bond pad 9a and the substrate bond pad 9b as is shown in FIG. 5b. Gold wire bonds 13 that resist corrosion are preferred.

In order to protect the silicon die, a passivation coating of silicon nitride is added to the chip surface to protect it from moisture, oil, and salt usually present on finger tips. A further coating of gas deposited Parlyne C is used as a final surface coating to protect against passivation defects such as pinholes and scratches on the assembly.

The use of multiple dies with the present invention increases yield and reduces the costs associated with each die. As smaller dies are used, a greater proportion of a circular wafer is useable and failures in manufacturing result in the loss of a small die; using a single die would result in the loss of a larger die. Such an embodiment further increases resiliency and improves reliability during operation. As such an array of small dies arranged in an array could be used for imaging fingertips, palms or larger areas as desired.

Further, the use of the present invention, because it amplifies the induced charge on a sensing electrode, does not require flexing of the dies. A thin stiff coating to prevent flexing can be applied over the dies as an overglass. This would reduce stress related failures.

Numerous other embodiments may be envisaged without departing from the spirit and scope of the invention.

What I claim is:

1. A capacitive fingerprint sensing device comprising:
   an array of sense elements spaced apart, each of the sense elements comprising a sensing electrode and an amplifier circuit wherein the amplifier circuit amplifies voltage induced in the sensing electrode by a biological source, each sense element lacking means for inducing, from within the sensing device, any charge on its respective sensing electrode.

2. The device of claim 1 further comprising a ground ring disposed on at least two sides of the array of sense elements.

3. The device of claim 1 further comprising electrostatic discharge protection means between the sense electrode and the amplifier.

4. The device of claim 1 further comprising a low pass filter to stabilize the DC operating point of the circuit.

5. The device of claim 1 further comprising means for selectively providing the output signal of at least a sensing element to an output means of the device.

6. The device of claim 5 wherein the means for selectively providing the output signal of at least a sensing element at an output means of the device is a timing and sequencing circuit.

7. The device of claim 5 wherein the means for selectively providing the output signal of at least a sensing element at an output means of the device is a random access logic circuit.

8. The device of claim 1 wherein the amplifier circuit includes capacitive feedback.

9. The device of claim 1 wherein the amplifier circuit is a differential amplifier.

10. The device of claim 9 wherein the amplifier circuit includes capacitive feedback.

11. The device of claim 1 wherein the amplifier circuit is a charge amplifier.

12. The device of claim 11 wherein the amplifier circuit includes capacitive feedback.

13. A capacitive fingerprint sensing device comprising:
    a substrate;
    an array of dies spaced in close proximity to each other for sensing a fingerprint, the array of dies being bonded to the substrate, each die comprising a ground plane, an array of sense elements spaced apart and disposed on and spaced from one face of the ground plane, each sense element comprising a sensing electrode and an amplifier circuit wherein the amplifier circuit amplifies voltage induced in the sensing electrode by a biological source, each die lacking means for inducing, from within the sensing device, any charge on each sense element in the array of sense elements.

14. A capacitive fingerprint sensing device comprising:
    at least a die for sensing a fingerprint,
    each at least a die comprising an array of sense elements spaced apart some sense elements comprising a sensing electrode, electrostatic protection means, a low pass filter, and an amplifier circuit wherein the amplifier circuit is capable of amplifying a voltage induced in the sensing electrode by a biological source, a die lacking means for inducing, from within the sensing device, any charge on the sense elements in the array of sense elements.

15. The device of claim 14 wherein the amplifier circuit is a differential amplifier.

16. The device of claim 15 wherein the amplifier circuit includes capacitive feedback.

17. The device of claim 14 wherein the amplifier circuit is a charge amplifier.

18. The device of claim 17 wherein the amplifier circuit includes capacitive feedback.

* * * * *